United States Patent
Jonnes

(10) Patent No.: US 6,216,801 B1
(45) Date of Patent: Apr. 17, 2001

(54) METHOD AND APPARATUS FOR PROVIDING PROPORTIONAL INJECTION OF ADDITIVES INTO DRILLING FLUIDS

(75) Inventor: Nelson Jonnes, Stillwater, MN (US)

(73) Assignee: American Polywater Corporation, Stillwater, MN (US)

( * ) Notice: Subject to any disclaimer, the term of this patent is extended or adjusted under 35 U.S.C. 154(b) by 0 days.

(21) Appl. No.: 09/054,780

(22) Filed: Apr. 3, 1998

(51) Int. Cl.$^7$ .................................................. E21B 21/08
(52) U.S. Cl. .............................. 175/65; 175/38; 175/217
(58) Field of Search .......................... 175/65, 66, 217, 175/72, 70, 38

(56) References Cited

U.S. PATENT DOCUMENTS

| | | | |
|---|---|---|---|
| Re. 29,716 | 8/1978 | Clampitt et al. ....................... | 175/65 |
| 1,816,324 | 7/1931 | Hansen . | |
| 3,231,030 | 1/1966 | Blom ....................................... | 175/65 |
| 3,502,543 | 3/1970 | Sewell ..................................... | 175/24 |
| 3,559,739 | 2/1971 | Hutchinson ........................... | 166/311 |
| 3,637,031 | * 1/1972 | Hull et al. .............................. | 175/66 |
| 3,852,200 | 12/1974 | Meyer ................................ | 252/8.5 A |
| 3,909,421 | 9/1975 | Gaddis ............................. | 252/8.55 D |
| 3,988,246 | 10/1976 | Hartfiel .............................. | 252/8.5 A |
| 4,012,329 | 3/1977 | Hayes et al. ....................... | 252/8.5 P |
| 4,120,369 | 10/1978 | Fischer et al. .......................... | 175/72 |
| 4,128,528 | 12/1978 | Frisque et al. ..................... | 260/42.55 |
| 4,187,911 | 2/1980 | Hutchinson et al. ................. | 166/312 |
| 4,321,968 | 3/1982 | Clear ................................... | 166/275 |
| 4,445,576 | 5/1984 | Drake et al. ......................... | 166/291 |
| 4,633,950 | 1/1987 | Delhommer et al. ............... | 166/295 |
| 4,664,816 | 5/1987 | Walker ............................. | 252/8.512 |
| 4,704,213 | 11/1987 | Delhommer et al. ............. | 252/8.512 |
| 4,867,256 | 9/1989 | Snead ..................................... | 175/66 |
| 5,010,966 | 4/1991 | Stokley et al. ......................... | 175/66 |
| 5,076,373 | * 12/1991 | Hale et al. .............................. | 175/40 |
| 5,333,698 | 8/1994 | Van Slyke .............................. | 175/65 |
| 5,586,608 | 12/1996 | Clark et al. ............................ | 175/40 |
| 5,715,896 | * 2/1998 | Naraghi .................................. | 175/40 |
| 6,035,952 | * 3/2000 | Bradfield et al. ...................... | 175/66 |
| 6,039,128 | * 3/2000 | Brunato ................................. | 175/70 |

OTHER PUBLICATIONS

Griffin, "Trends in HDD Drilling Fluid Products," *Underground Construction*, pp. 45–48, Mar. 1998.

* cited by examiner

Primary Examiner—William Neuder
Assistant Examiner—Zakiya Walker
(74) Attorney, Agent, or Firm—Michael S. Sherrill

(57) ABSTRACT

Injection of a drilling fluid additive into a drilling fluid, as the drilling fluid is being pumped into a bore hole, in direct proportion to the amount of drilling fluid being pumped.

18 Claims, 2 Drawing Sheets

METHOD AND APPARATUS FOR PROVIDING PROPORTIONAL INJECTION OF ADDITIVES INTO DRILLING FLUIDS

FIELD OF THE INVENTION

The invention relates to the introduction of additives to drilling fluids.

BACKGROUND

Drilling through the earth is a complex endeavor, requiring sophisticated drilling equipment and drilling fluids, commonly referenced as drilling mud, in order to drill substantial distances through the various types of rock and soil commonly encountered during the drilling of vertical and horizontal bores.

Drilling mud is generally pumped from a reservoir of the drilling mud to the bottom of the bore through a central channel in the drill string. Drilling muds must be capable of performing a number of different functions, including specifically, but not exclusively, (i) cooling and lubricating the drill bit, (ii) delivering hydraulic power to the drill bit, (iii) carry cuttings upward during circulation, (iv) suspending cuttings and preventing appreciable settling when circulation is stopped, (v) preventing blowout, (vi) prevent wash out, and (vii) preventing excessive permeation of water from the bore into the surrounding formations.

A number of different drilling muds have been used over the years. Simple, unadulterated water can be used for some limited applications, but is not generally used due to its limited functionality as a drilling mud. One of the most elementary drilling muds is water mixed with drilled solids, commonly referenced as native drilling mud. Native drilling muds are generally effective for cooling and lubricating the drill bit, delivering hydraulic power to the drill bit, and preventing blowout at shallow depths. However, native drilling mud possesses a limited ability to carry cuttings upward during circulation, suspend cuttings when circulation is stopped, or reduce permeation of water into surrounding formations and washout. Over time, a number of different additives have been developed for native drilling muds in an effort to overcome these limitations.

The standard base drilling mud used today in both vertical and horizontal drilling is an aqueous slurry of bentonite clay (hereinafter "bentonite mud"). The bentonite clay may be modified with any of a number of different organic and inorganic drilling fluid additives such as sodium hydroxide, barium sulfate, lignite, polyacrylamide, and/or carboxymethylhydroxyethyl cellulose in an effort to enhance performance of the drilling mud.

U.S. Pat. No. 4,867,256, issued to Snead, discloses a method and apparatus for introducing polymer additives, such as a polyacrylamide, into drilling muds by periodically pumping liquid polymer into the conduit used to convey drilling mud from a mud pit to the kelley of a conventional drilling rig. Snead specifically discloses that a convenient method for adding the polymer into the drilling mud is to inject a defined quantity of the polymer each time an additional length of pipe is added to the drill string. While this method of introducing additives into a drilling mud comprises a substantial advance over prior procedures, the method has limited potential for commercial application due to the potential variability in the concentration of polymer within the drilling mud, and the relatively high cost of most additives compared to the cost of standard bentonite mud. In other words, the performance benefits provided by addition of a drilling fluid additive by this method are generally considered insufficient to justify the significant increase in cost.

In order to provide drilling fluids having the appropriate concentration of bentonite and/or additives, drilling fluids are routinely prepared by a batch process wherein the bentonite and/or additives are mixed into a known volume of water and then pumped into the bore. Such a procedure is highly labor intensive and requires either multiple mixing tanks or periodic pauses in drilling to permit another batch of drilling fluid to be mixed.

Accordingly, a substantial need exists for a cost effective method of introducing drilling fluid additives into drilling mud.

SUMMARY OF THE INVENTION

The invention is directed to a cost effective method and apparatus capable of proportionally injecting a drilling fluid additive into a drilling fluid.

The method involves injection of a drilling fluid additive into a drilling fluid, as the drilling fluid is being pumped into a bore hole, in direct proportion to the amount of drilling fluid being pumped. Injection of the additive in direct proprtion to the drilling fluid is important as the concentration of additive in the drilling fluid can significantly impact performance of the drilling fluid, with deteriorating performance observed when insufficient or excessive additive is injected into the drilling fluid. This is particularly true for horizontal directional drilling.

The apparatus is a standard drilling rig equipped with a means for injecting a drilling fluid additive into the drilling fluid, as the drilling fluid is being pumped by the rig into the bore hole, in direct proportion to the amount of drilling fluid being pumped.

A specific system capable of providing the desired directly proportional injection of drilling fluid additive into a drilling fluid, comprises (i) a primary pump for pumping the drilling fluid, (ii) a secondary pump for injecting the drilling fluid additive into the drilling fluid, and (iii) a control system in communication with both the primary and secondary pumps for operating the secondary pump at a flow rate directly proportional to the flow rate of the primary pump.

DETAILED DESCRIPTION OF THE DRAWINGS INCLUDING A BEST MODE

Definitions

Figure 1:
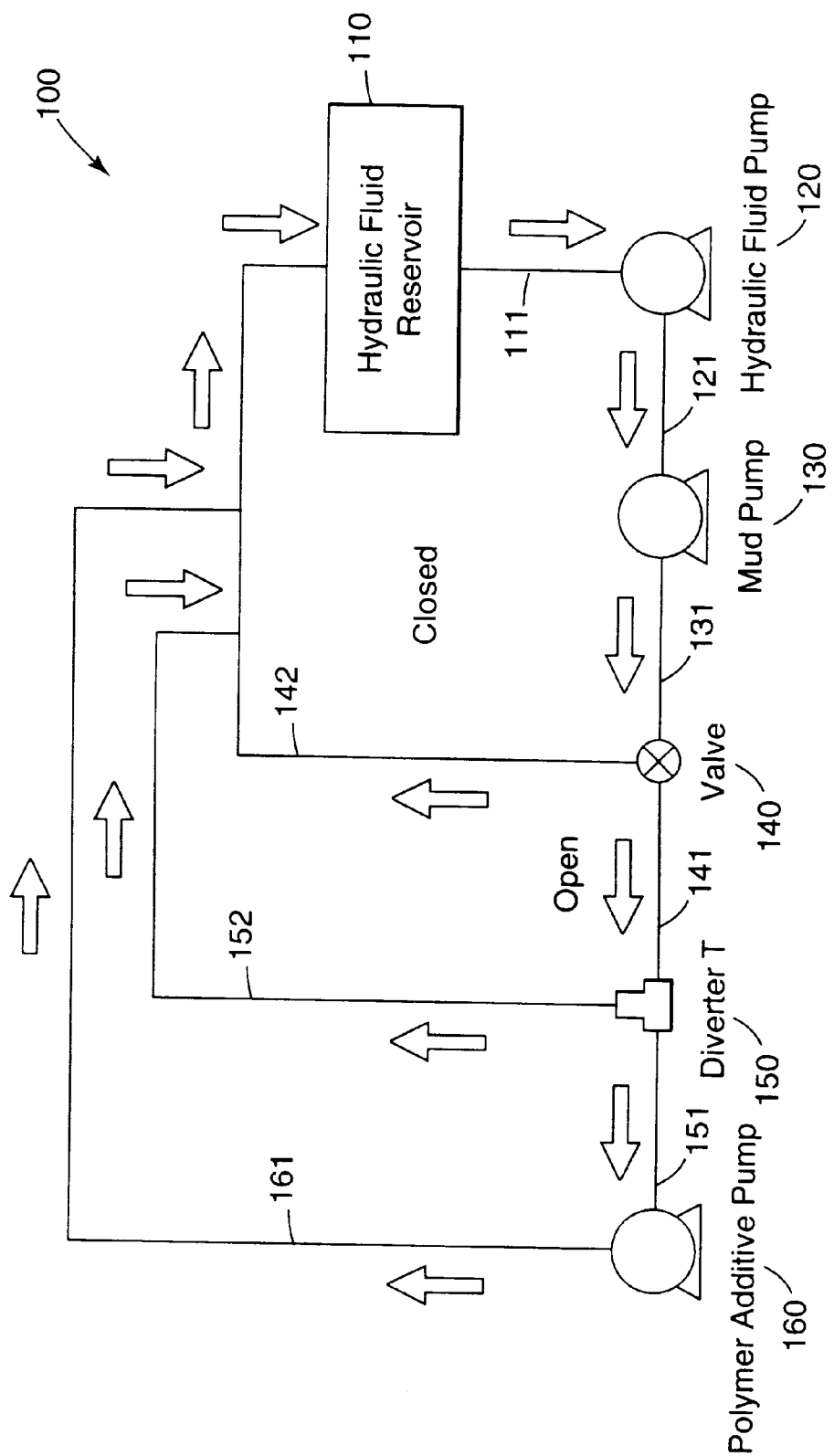
FIG. 1 is a schematic diagram of the hydraulic system of one embodiment of the invention.

As utilized herein, including the claims, the phrase "directly proportional," when used to describe the amount of a drilling fluid additive introduced into a drilling fluid, means that the quantity/flow of drilling fluid additive introduced into the drilling fluid is based upon the actual quantity/flow of drilling fluid (e.g., 1 part additive per 100 parts drilling fluid), as opposed to an indirect variable such as the distance traveled by the drill string.

As utilized herein, including the claims, the phrase "drilling fluid," refers collectively to organic and/or inorganic based drilling muds and unadulterated water.

Nomenclature

100 Hydraulic Power System
110 Hydraulic Fluid Reservoir
111 Hydraulic Line Connecting Hydraulic Fluid Reservoir to Hydraulic Fluid Pump 120 Hydraulic Fluid Pump
121 Hydraulic Line Connecting Hydraulic Fluid Pump to Mud Pump
130 Mud pump
131 Hydraulic Line Connecting Mud Pump to Shut Off Valve
140 Shut Off Valve
141 Hydraulic Line Connecting Shut Off Valve to Diverter T
142 Hydraulic Return Line
150 Diverter T
151 Hydraulic Line Connecting First Leg of Diverter T to Additive Pump
152 Hydraulic Line Connecting Second Leg of Diverter T to Hydraulic Return Line
160 Polymer Additive Pump
161 Hydraulic Line Connecting Polymer Additive Pump to Hydraulic Return Line
200 Drilling Fluid Feed System
210 Mud Reservoir
211 Mud Pipe Connecting Mud Reservoir to Mud Pump
212 Mud Pipe Connecting Mud Pump to Drill String
220 Polymer Additive Reservoir
221 Pipe Connecting Polymer Additive Reservoir to Polymer Additive Pump
222 Pipe Connecting Polymer Additive Pump to Mud Pipe Upstream from Mud Pump
300 Horizontal Directional Drilling Rig
310 Drill String Method of Proportionally Injecting Additive Into Drilling Fluid An additive is injected into a drilling fluid (i.e., drilling mud or unadulterated water), as the drilling fluid is being pumped to a drill string (not shown), at a flow rate which is directly proportional to the flow rate of the drilling fluid. It is important that the additive be injected in direct proportion to the amount of drilling fluid. Additives generally need to be present in drilling fluids at relatively low concentrations, typically at concentrations of less than about 3 wt % and often less than 0.5 wt % when added to a drilling mud, in order to provide the desired effect (i.e., improve the particle suspension character of the drilling fluid), with the introduction of inadequate amounts of polymer failing to contribute the desired property or characteristic to the drilling fluid and excessive amounts significantly increasing the cost of the drilling fluid without providing a corresponding benefit and actually reducing the jet cutting action of the drilling fluid normally observed at the bit. Indeed, most additives, particularly polymeric additives, are generally so much more expensive than standard drilling fluids, such as bentonite drilling mud, that even modest savings in the amount of additive used can result in significant overall cost savings. This is particularly true in light of the fact that most drilling operations utilize significant quantities of drilling fluid (i.e., on the order of 1–3 gallons of drilling fluid per gallon (0.13 ft$^3$) of hole volume).

For the same reasons that direct proportionality is important, it is also important that the polymer additive be injected into the drilling fluid rather than by a passive feed system. Reliance upon a passive system to introduce the additive into the drilling fluid, such as a venturi system, does not provide the appropriate control over relative flow rates under the various operating conditions commonly encountered during drilling operations i.e., flow rates provided by a venturi vacuum are nonlinear over a significant range). This is particularly true in light of the relatively high viscosity of many polymeric materials used as a beneficiating agent in drilling fluids.

A variety of materials are known to function as beneficiating agents in drilling fluid. A nonexhaustive list of such additives includes specifically, but not exclusively, polyacrylamide, salts of polyacrylic acid, hydroxymethyl cellulose, hydroxyethyl cellulose, carboxymethyl cellulose, modified starches, polysaccharides, gums, detergents, metal hydroxides and sodium carbonate.

When polyacrylamide and/or polyacrylic acid salts are added to a drilling fluid, the polyacrylamide is preferably added in amounts sufficient to produce a drilling fluid containing about 0.02 to 2 wt % polyacrylamide in the drilling fluid, with concentrations of about 0.02 to 0.1 wt % preferred when the drilling fluid is a drilling mud and concentrations of about 0.02 to 2 wt % preferred when the drilling fluid is unadulterated water.

Of particular interest as a polymeric additive for drilling fluid is an inverse water-in-oil emulsion of polyacrylamide available from Cytec Corporation under the designation AF126. Such an inverse emulsion can retain a relatively low viscosity for extended periods prior to being introduced into a bore, with a rapid increase in viscosity observed once the emulsion is subjected to the high shear and mixing environment occuring at the jets within the bore. Such a delayed increase in viscosity simplifies injection of the polymer into the drilling fluid and pumping of the polymer-containing drilling fluid into the bore.

A system of particular interest involves the injection of a polyacrylic acid emulsion available from B.F. Goodrich under the designation ETD 2623 ™ into neutralized and appropriately deionized water to form a bentonite-free drilling fluid having a satisfactory yield factor. Such a bentonite-free drilling fluid can have a relatively low viscosity under high shear conditions while being capable of suspending silica sand particles indefinitely.

Construction of System for Proportionally Introducing Additive Into Drilling Fluid A number of different mechanisms can be employed for injecting an additive into drilling fluid, from sophisticated microcontrolled systems capable of measuring the flow rate of the drilling fluid being pumped to the drill string and proportionally pumping the additive into the drilling fluid, to use of a single pump to feed both drilling fluid and additive to the drill string with appropriate gearing to achieve the desired difference in flow rates.

Figure 2:
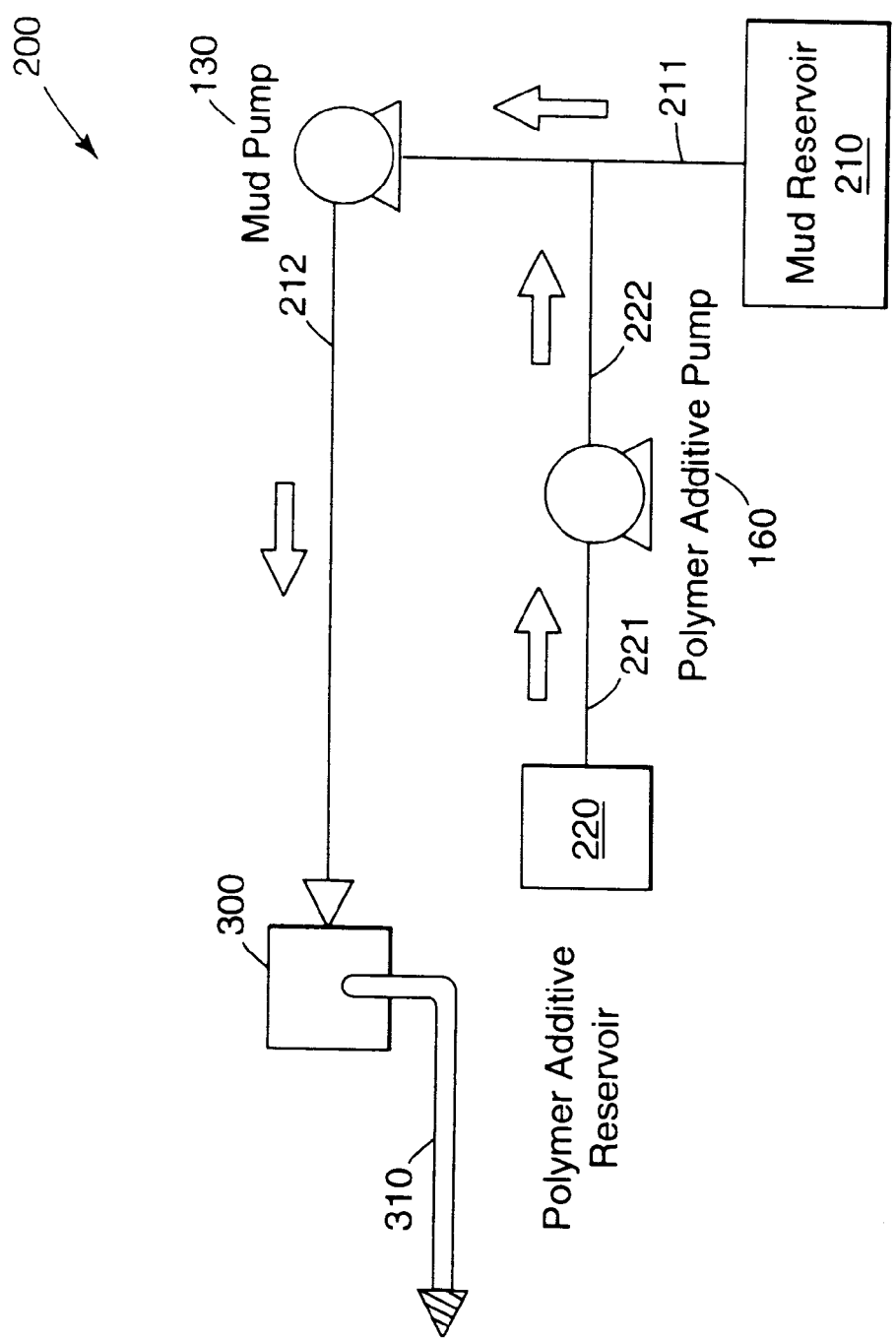
FIG. 2 is a schematic diagram of the drilling mud and drilling fluid additive systems of one embodiment of the invention.

A relatively simple and inexpensive apparatus for injecting an additive into a drilling fluid at a flow rate which is directly proportional to the flow rate of the drilling fluid utilizes the standard hydraulic power system of horizontal directional drilling rigs to drive both the mud pump and the additive pump. Schematics of the hydraulic and fluid flow systems for such a hydraulic powered apparatus are shown in FIGS. 1 and 2, respectively. Such an apparatus may be incorporated into a drilling rig by the original equipment manufacturer or retrofitted onto existing equipment.

As shown in FIGS. 1 and 2, the hydraulic power system 100 includes a hydraulic fluid reservoir 110 in fluid communication via hydraulic line 111 with a hydraulic fluid pump 120. The hydraulic fluid pump 120 conveys hydraulic fluid under pressure through hydraulic fluid line 121 to a mud pump 130, where hydraulic power is used to power the mud pump 130 and pump drilling mud (not shown) from a drilling mud reservoir 210 through a mud feed pipe 212 to a drill string (not shown). The hydraulic fluid is then conveyed through hydraulic line 131 to a shut off valve 140. When shut off valve 140 is closed, the hydraulic fluid is routed back to the hydraulic fluid reservoir 110 through hydraulic return line 142. When shut off valve 140 is open, the hydraulic fluid flows into a diverter T 150 where a portion of the hydraulic fluid is diverted from the main flow of hydraulic fluid into line 151 for use in powering a polymer additive pump 160, with the balance of the hydraulic fluid returned to the hydraulic fluid reservoir 110 through line 152 and return line 142. The polymer additive pump 160 pumps additive from a polymer additive reservoir 220 into the length of drilling mud pipe 211 between the drilling mud reservoir 210 and the drilling mud pump 130 (i.e., upstream from the mud pump 130).

The apparatus may be provided with appropriate controls for adjusting the proportional flow rate of the polymer additive as desired. For example, the diverter T 150 and/or the polymer additive pump 160 may be provided with mechanical and/or electrical controls for changing the flow rate of the polymer additive pump 160 relative to the flow rate of the drilling mud. Such controls preferably allow the proportionality to be changed at any time during a drilling operation, so as to permit changes in the concentration of the additive in the drilling mud based upon changes observed during the drilling operation (e.g., a change in the type of soil being drilled from sand to clay, or an indication that excessive water loss is occurring within the bore hole).

I claim:

1. A method of drilling a bore hole into the earth with a drill string, comprising:
   (a) pumping an aqueous drilling fluid into the bore hole through an internal channel in the drill string, and
   (b) injecting an additive into the aqueous drilling fluid, as the aqueous drilling fluid is being pumped into the bore hole, in direct proportion to the amount of aqueous drilling fluid being pumped, with the amount of additive injected determined by measuring the amount of drilling fluid pumped.

2. The method of claim 1 wherein the proportionality of additive injected into the aqueous drilling fluid is adjustable.

3. The method of claim 2 wherein the proportionality of additive injected into the aqueous drilling fluid is adjustable before and during a drilling operation.

4. The method of claim 1 wherein the aqueous drilling fluid is water.

5. The method of claim 4 wherein the additive is a polyacrylamide, and sufficient polyacrylamide is injected into the aqueous drilling fluid to achieve a concentration of between about 0.02 to 2 wt % polyacrylamide in the aqueous drilling fluid.

6. The method of claim 5 wherein the polyacrylamide is injected as an inverse water-in-oil emulsion of polyacrylamide.

7. The method of claim 1 wherein the aqueous drilling fluid is an aqueous slurry of bentonite.

8. The method of claim 7 wherein the additive is a polyacrylamide, and sufficient polyacrylamide is injected into the aqueous drilling fluid to achieve a concentration of between about 0.02 to 0.1 wt % polyacrylamide in the aqueous drilling fluid.

9. The method of claim 8 wherein the polyacrylamide is injected as an inverse water-in-oil emulsion of polyacrylamide.

10. The method of claim 1 wherein the bore hole is a horizontally drilled bore hole.

11. The method of claim 1 wherein the bore hole is a horizontal directionally drilled bore hole.

12. The method of claim 1 wherein the additive is a polyacrylamide.

13. The method of claim 12 wherein the polyacrylamide is injected as an inverse water-in-oil emulsion of polyacrylamide.

14. The method of claim 1 wherein (i) the aqueous drilling fluid is pumped into the drill string by a primary pump, (ii) the additive is pumped into the aqueous drilling fluid by a secondary pump, and (iii) the primary and secondary pumps are commonly controlled so as to provide proportional pumping of the aqueous drilling fluid and the additive.

15. A drilling rig for drilling a bore hole into the earth with a drill string, the drilling rig including:
   (a) a system for pumping an amount of drilling fluid into the bore hole through the drill string, and
   (b) a means for injecting an additive into the drilling fluid, as the drilling fluid is being pumped into the bore hole, in direct proportion to the amount of drilling fluid being pumped wherein the means for injecting the additive includes means for measuring the amount of drilling fluid pumped.

16. The drilling rig of claim 15 further including a means for adjusting the proportionality of additive being injected into the drilling fluid.

17. The drilling rig of claim 15 wherein the drilling rig is a horizontal directional drilling rig.

18. The drilling rig of claim 15 wherein (i) the system for pumping drilling fluid includes a primary pump, (ii) the means for injecting the additive into the drilling fluid is a secondary pump, and (iii) the rig further includes a control system in communication with the primary and secondary pumps for operating the secondary pump at a flow rate directly proportional to the flow rate of the primary pump.

* * * * *